United States Patent [19]
Amakusa

[11] Patent Number: 5,857,341
[45] Date of Patent: Jan. 12, 1999

[54] SPECIMEN-COOLING DEVICE

[75] Inventor: Takaaki Amakusa, Kanagawa, Japan

[73] Assignee: Jeol Ltd., Tokyo, Japan

[21] Appl. No.: 757,260

[22] Filed: Nov. 27, 1996

[30]  Foreign Application Priority Data

Nov. 30, 1995  [JP]  Japan .................................. 7-312435

[51] Int. Cl.$^6$ .................................................. F25B 19/00
[52] U.S. Cl. ............................................. 62/51.1; 62/383
[58] Field of Search ..................................... 62/51.1, 383

[56]        References Cited

U.S. PATENT DOCUMENTS

| | | | |
|---|---|---|---|
| 4,408,464 | 10/1983 | Salour et al. ............................. | 62/51.1 |
| 4,459,823 | 7/1984 | Josephs et al. ........................... | 62/51.1 |
| 4,495,782 | 1/1985 | Salour et al. ............................. | 62/51.1 |
| 4,644,761 | 2/1987 | Chatzipetros et al. ................... | 62/51.1 |
| 5,237,825 | 8/1993 | Menzl et al. ............................. | 62/51.1 |
| 5,410,910 | 5/1995 | Somlyo et al. ........................... | 73/105 |
| 5,542,256 | 8/1996 | Batey et al. .............................. | 52/61.1 |

*Primary Examiner*—Ronald C. Capossela
*Attorney, Agent, or Firm*—Webb Ziesenheim Bruening Logsdon Orkin & Hanson, P.C.

[57]        ABSTRACT

There is disclosed a sample-cooling device for efficiently cooling a sample observed with a scanning probe microscope down to a cryogenic temperature. Cryogenic temperature provided by liquid nitrogen is transferred to a stage base plate from a liquid nitrogen vessel via a heat shield on the side of the cryogenic source, a first flexible conductor, and a heat shield on the sample side. The whole stage base plate is cooled to the liquid nitrogen temperature. Cryogenic temperature provided by liquid helium is transferred from a liquid helium vessel to a heat conductor on the sample side via a heat conductor on the side of the cryogenic source, a heat shield on the side of the cryogenic source, a second flexible heat conductor, and a heat shield on the sample side. The heat conductor on the sample side is cooled to the liquid helium temperature. The cryogenic temperature is then transferred to the sample via a probe electrode in contact with the heat conductor on the sample side. As a result, the sample is cooled by the cryogenic temperature provided by the liquid helium.

9 Claims, 9 Drawing Sheets

FIG. 14 a
SPECIMEN-COOLING DEVICE

FIELD OF THE INVENTION

The present invention relates to a device for cooling a sample that is observed with a scanning probe microscope such as scanning tunneling microscope (STM), atomic force microscope (AFM), magnetic force microscope (MFM), or scanning ion-conductance microscope (SICM).

BACKGROUND OF THE INVENTION

The scanning tunneling microscope is designed to obtain a sample image with atomic resolution from a tunneling current flowing between a probe tip and a sample. On the other hand, the atomic force microscope produces an image of a sample with atomic resolution from an atomic force exerted between a probe tip attached to the front end of a cantilever and the sample.

In this scanning probe microscope, the sample is often observed while maintained at cryogenic temperatures by a sample-cooling device. One major object of maintaining the sample at cryogenic temperatures is to reduce the effect of thermal vibrations of sample atoms, thereby enhancing the resolution of the atomic image. Another major object is to observe the physical characteristics of the sample at quite low temperatures.

The sample-cooling device is required to (1) be capable of cooling the sample down to cryogenic temperatures, (2) be capable of reaching cryogenic temperatures in a short time, and (3) consume only a small amount of refrigerant for the cooling per unit time.

SUMMARY OF THE INVENTION

In view of the foregoing, the present invention has been made.

It is an object of the present invention to provide a sample-cooling device capable of cooling a sample to cryogenic temperatures in a short time.

It is another object of the invention to provide a sample-cooling device capable of cooling a sample with only a small amount of refrigerant.

A sample-cooling device which achieves these objects in accordance with the teachings of the invention comprises: a sample stage; a first cooling means for cooling the sample stage to a first temperature; a first heat conductor mounted to the sample stage via a heat insulating member; a second cooling means for cooling the first heat conductor to a second temperature lower than the first temperature; and a sample holder removably attached to the sample stage. The sample holder has a contact portion which is brought into contact with the first heat conductor that is on the side of a sample.

Normally, the aforementioned first cooling means comprises liquid nitrogen and a heat transfer means used to transfer the low temperature produced by the liquid nitrogen to the sample stage. The second cooling means comprises liquid helium and a heat transfer means used to transfer the cold temperature produced by the liquid helium to the first heat conductor on the side of the sample and also to the sample holder.

The liquid nitrogen temperature and the liquid helium temperature referred to herein do not mean strict physical constants. For example, the liquid nitrogen temperature means a temperature range extending upward from the physically strict liquid nitrogen temperature by several or tens of K.

Other objects and features of the invention will appear in the course of the description thereof, which follows.

DETAILED DESCRIPTION OF THE INVENTION

For ease of understanding, mutually orthogonal axes are taken as X-, Y, and Z-axes, respectively. The direction indicated by the arrow X is referred to as the forward direction or X-direction. The direction indicated by the arrow Y is referred to as the leftward direction or Y-direction. The direction indicated by the arrow Z is referred to as the upward direction or Z-direction. A direction opposite to the direction indicated by the arrow X is referred to as the rearward direction or -X-direction. A direction opposite to the direction indicated by the arrow Y is referred to as the rightward direction or -Y-direction. A direction opposite to the direction indicated by the Z-axis is referred to as the downward direction or -Z-direction. Furthermore, the X- and -X-directions are collectively referred to as the longitudinal direction. The Y- and -Y-directions are collectively referred to as the horizontal direction. The Z- and -Z-directions are collectively referred to as the vertical direction.

In addition, "⊙" means an arrow directed from the rear of the plane of the figure to the front. Conversely, "⊗" means an arrow directed from the front to the rear.

Figure 1:
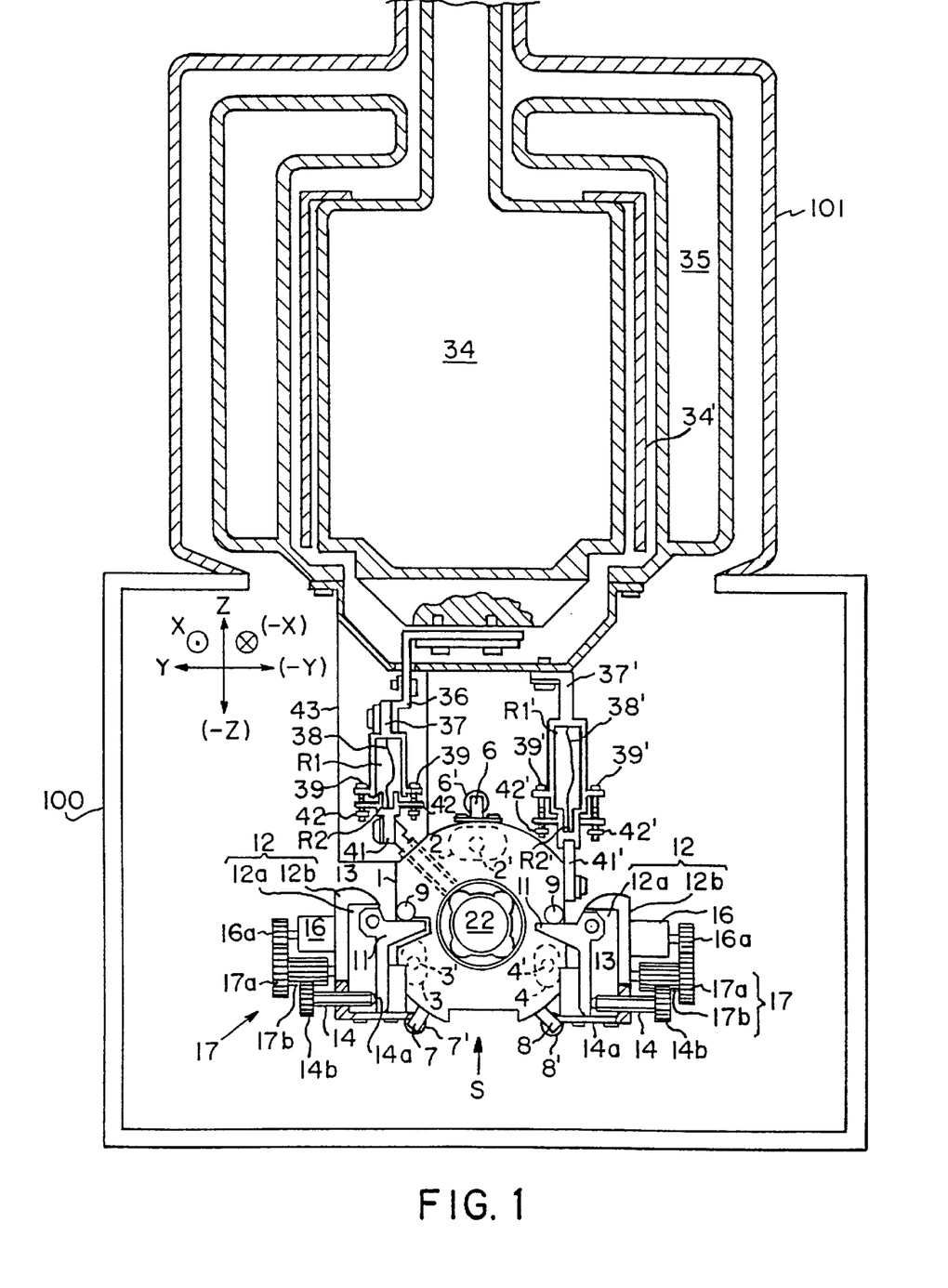
FIG. 1 is a front elevation partially in cross section of a sample stage on which a sample holder according to the present invention is mounted.
Figure 2:
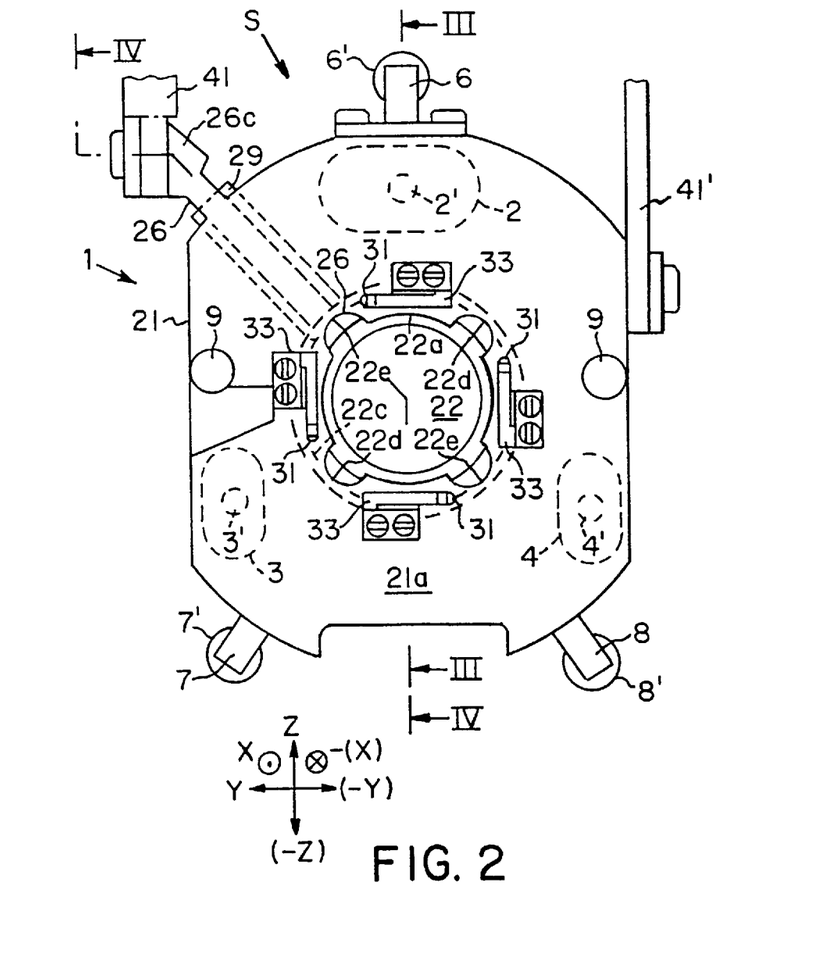
FIG. 2 is an enlarged view of main portions of the sample stage shown in FIG. 1.
Figure 3:
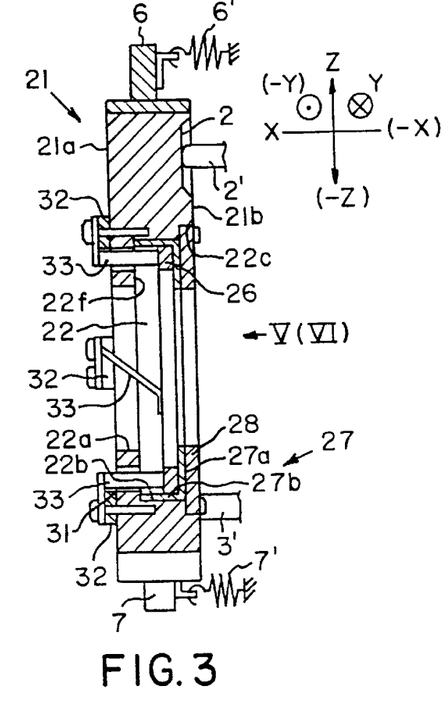
FIG. 3 is a cross-sectional view taken on line III—III of FIG. 2.
Figure 4:
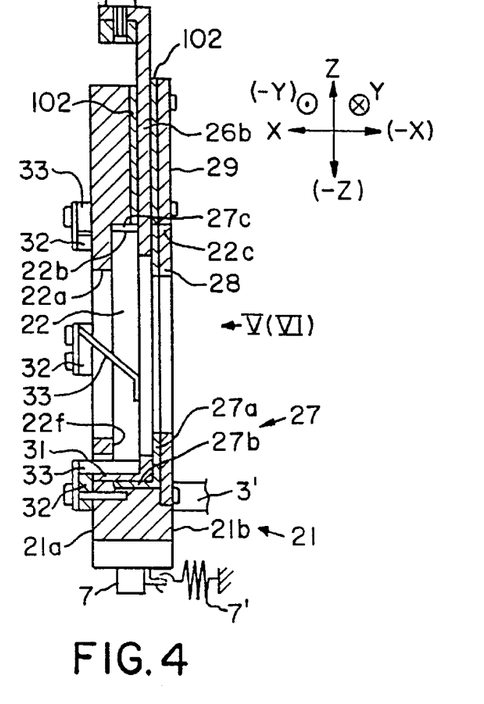
FIG. 4 is a cross-sectional view taken on line IV—IV of FIG. 2.
Figures 5, 8A, 8B:
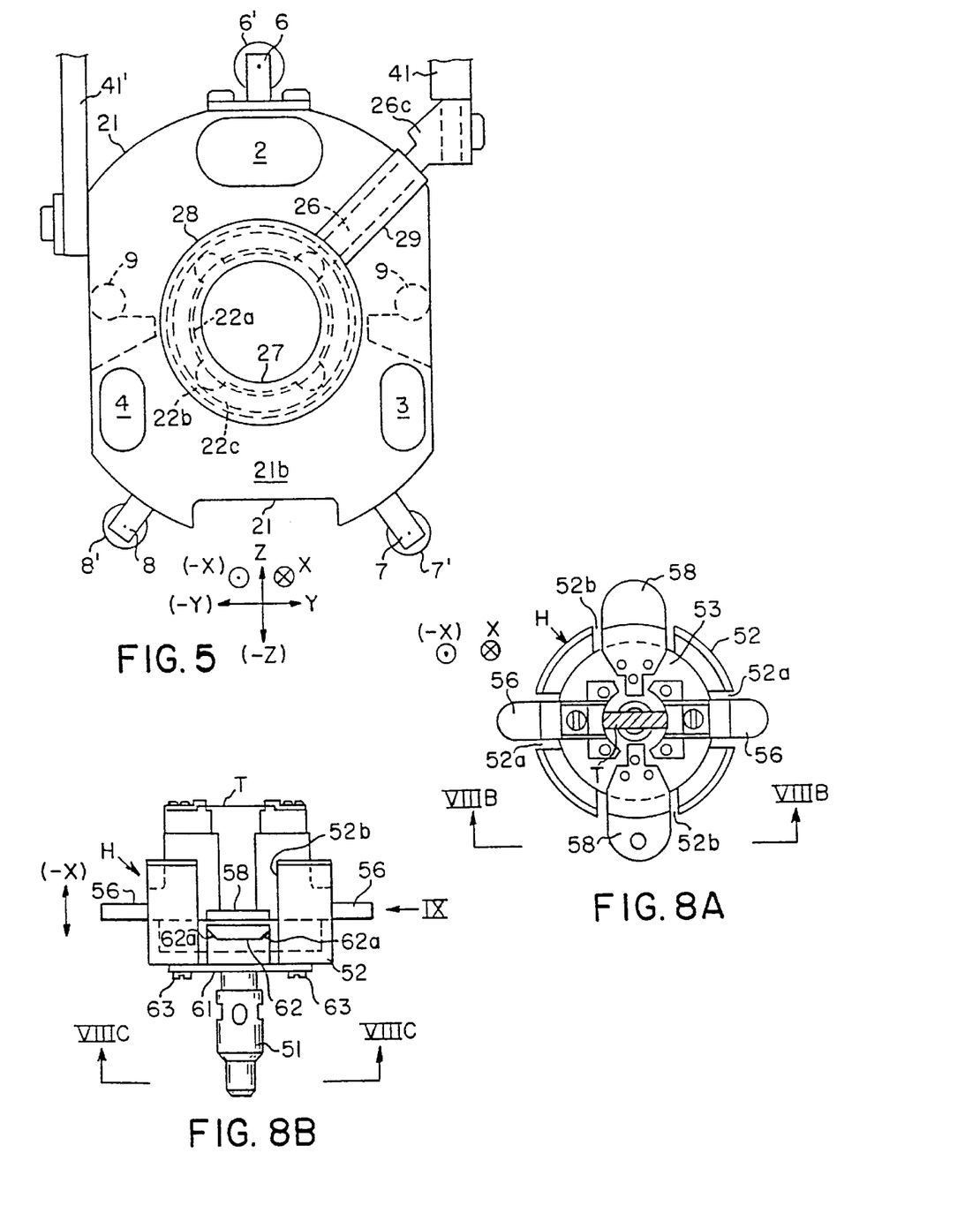
FIG. 5 is a view taken from the direction indicated by the arrow V of FIG. 4.
FIGS. 8A, 8B, and 8C are views of a sample holder according to the invention, the sample holder being mounted on the sample stage shown in FIG. 1.
Figure 6:
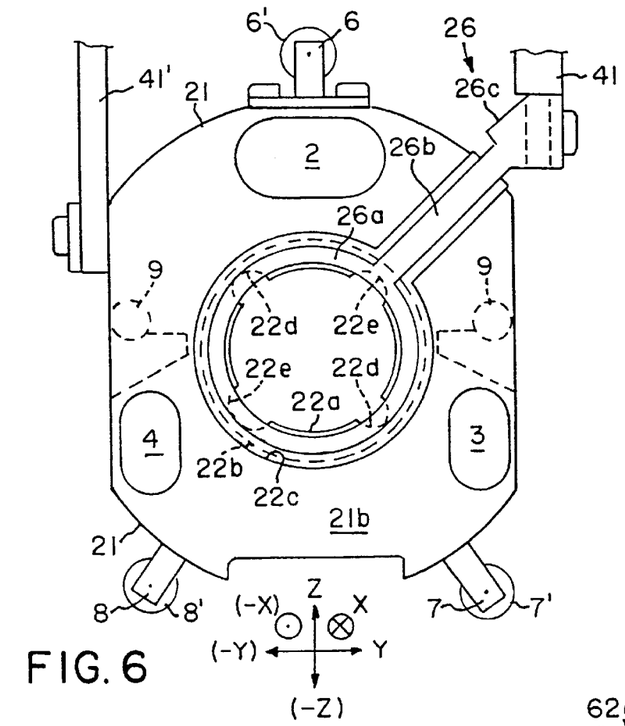
FIG. 6 is a view taken from the direction indicated by the arrow VI of FIG. 4.

A sample-cooling device according to the present invention is shown in FIGS. 1–11C. FIG. 1 is a front elevation of the sample-cooling device. FIG. 2 is an enlarged view of main portions of the device shown in FIG. 1. FIG. 3 is a cross-sectional view taken on line III—III of FIG. 2. FIG. 4 is a cross-sectional view taken on line IV—IV of FIG. 2. FIG. 5 is a view taken from the direction indicated by the arrow V of FIGS. 3 and 4. FIG. 6 is a view taken from the direction indicated by the arrow VI of FIGS. 3 and 4. In FIG. 6, components 27a, 27b, and 28 shown in FIGS. 3 and 4 are omitted. FIG. 7A is an enlarged view of a heat conductor shown in FIG. 1. FIG. 7B is a view similar to FIG. 7A, but showing the prior art heat conductor.

Figure 8C:
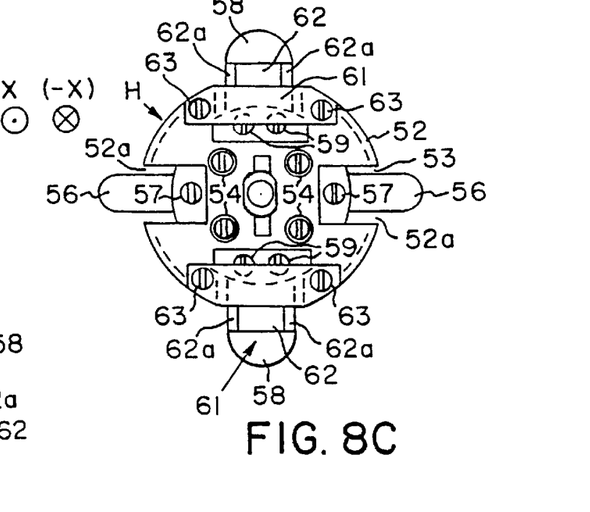
Figure 9:
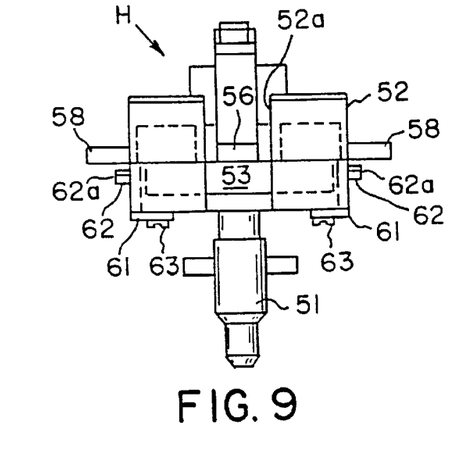
FIG. 9 is a view taken from the direction indicated by the arrow IX of FIG. 8B.
Figure 10:
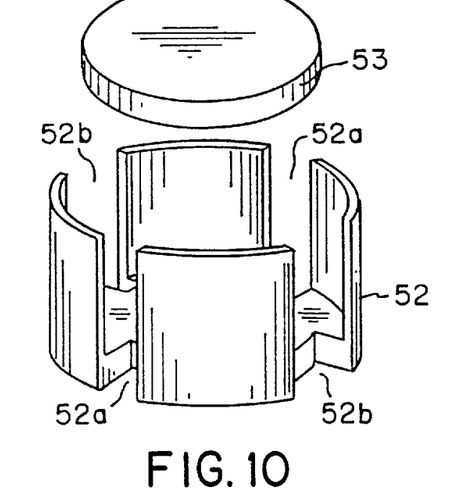
FIG. 10 is an exploded perspective view of some components of the sample holder shown in FIGS. 8A—8C.
Figure 11A:
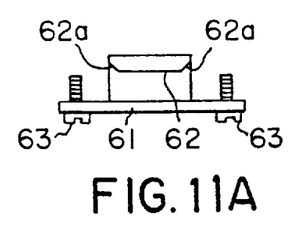
FIGS. 11A, 11B and 11C are front, bottom and side views of pushing force-generating-and-engaging members shown in FIGS. 8A–8C.
Figure 11B:
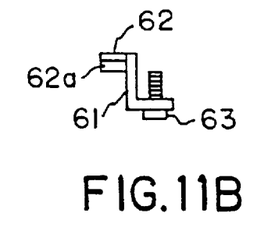
Figure 11C:
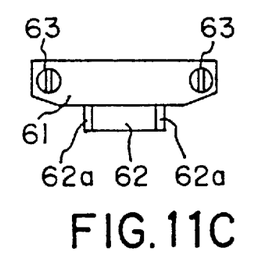

FIGS. 8A, 8B, and 8C show a sample holder mounted on a sample stage shown in FIG. 1. FIG. 8A is a view of the sample holder, taken from a side at which the sample is held. FIG. 8B is a view taken from the direction indicated by the arrow VIIIB of FIG. 8A. FIG. 8C is a view taken from the direction indicated by the arrow VIIIC of FIG. 8B. FIG. 9 is a view taken from the direction indicated by the arrow IX of FIG. 8B. FIG. 10 is an exploded perspective view of some components of the sample holder shown in FIGS. 8A–8C. FIGS. 11A–11C are front, bottom and side views of pushing force-generating members shown in FIGS. 8A–8C.

Referring to FIG. 1, a scanning probe microscope has a sample stage S which is positioned within a sample chamber 100 whose inside is maintained as an ultrahigh vacuum by a vacuum pumping system (now shown). A liquid helium vessel 34 and a liquid nitrogen vessel 35 are mounted above the chamber 100. The liquid helium produces a low temperature for cooling the sample to a cryogenic temperature. The liquid nitrogen vessel 35 is disposed around the liquid helium vessel 34 to thermally shield the liquid helium from surroundings. A heat shielding cylinder 34' is mounted between the liquid helium vessel 34 and the liquid nitrogen vessel 35 and connected with the liquid helium vessel 34. A cover 101 which covers the liquid nitrogen vessel is firmly mounted to the sample chamber 100.

The body of the sample stage S is indicated by reference numeral 1. Three shallow recesses 2, 3, and 4 (see FIGS. 2, 3, and 5) are formed in the rear surface of the body 1 of the stage. These recesses 2–4 act as positioning recesses. Positioning members whose front ends are indicated by 2', 3', and 4' (see FIGS. 2, 3, and 5), respectively, are disposed opposite to the positioning recesses 2, 3, and 4, respectively. The positioning members can be engaged in the positioning recesses 2, 3, and 4, respectively, as described below. Three tension spring connectors 6, 7, and 8 are attached to the body 1 of the stage. These connectors 6, 7, and 8 are pulled rearward (in the -X-direction) by tension springs 6', 7', and 8', respectively. Therefore, the body 1 of the stage bears against the positioning members in the positions of the recesses 2, 3, and 4. As a result, the body 1 of the stage is held in position in the X-direction. Under this condition, the body 1 of the stage can move within the Y-Z plane.

Two protrusions 9 used for adjustment of the vertical position are formed on the front surface of the body 1 of the stage. The bottom surfaces of the protrusions 9 are held by rotating arms 11, respectively. Brackets 12 are firmly held by frame members (not shown), respectively. The arms 11 are held to the brackets 12 adjacently to the stage body 1 so as to be capable of rotating about shafts 13, respectively.

Each bracket 12 consists of a flat plate portion 12a extending parallel to the Y-Z plane and a side wall portion 12b protruding forward from the outer surface of the flat plate portion 12a. The shafts 13 are mounted to the flat plate portions 12a, respectively.

The side wall portions 12b of the brackets 12 are provided with threaded holes, respectively. Position-adjusting screws 14 are engaged in these threaded holes, respectively. When rotated, the screws 14 move axially. Balls 14a are held against the inner ends of the position-adjusting screws 14, respectively. The balls 14a bear against the lower ends of the rotating arms 11, respectively. Tension springs (not shown) always apply rotating forces to the arms 11 to move them away from the position-adjusting protrusions 9, respectively. Since the balls 14a bear on the lower ends of the rotating arms 11, the arms 11 are prevented from being rotated by the tension springs (not shown).

An electric motor 16 and an idler gearset 17 consisting of a larger gear 17a and a smaller gear 17b are held to the outer surface of the side wall portion 12b of each bracket 12. An output gear 16a is mounted to the output shaft of each motor 16 and in mesh with the larger gear 17a of the gearset 17. The smaller gear 17b rotating with the larger gear 17a is in mesh with a gear 14b rigidly mounted to the outer end of each position-adjusting screw 14.

When the motor 16 is rotated, the gears 16a, 17a, 17b, and 14b are rotated in succession, thus rotating the position-adjusting screw 14. Concomitantly, the screw 14 moves forward or rearward. For example, if the screw 14 moves forward, the ball 14a pushes the lower end of the rotating arm 11 to thereby rotate the arm 11. This moves the position-adjusting protrusion 9 of the body 1 of the stage upward.

Accordingly, the vertical positions of the protrusions 9 can be adjusted by moving the adjusting screws 14 forward or rearward. Hence, the vertical position of the body 1 of the stage can be adjusted. Furthermore, the body 1 of the stage can be moved except along the Z-axis by adjusting the positions of the two opposite position-adjusting screws 14 in association.

In FIGS. 2–5, the body 1 of the stage has a stage base plate 21 made of a good thermal conductor such as a metal. The stage base plate 21 has a front surface 21a (on the side of the X-axis) shown in FIG. 2 and a rear surface 21b (on the side of the -X-axis) shown in FIGS. 5 and 6. The front surface 21a and the rear surface 21b are spaced from each other along the X-axis. The stage base plate 21 is centrally provided with a hole 22 for receiving the sample holder. Referring to FIGS. 3 and 4, this hole 22 for receiving the holder comprises a holder insertion port 22a on the side of the front surface 21a, a larger circular portion 22b located behind the holder insertion port 22a, and a key-shaped hole 22c (see FIG. 6) on the side of the rear surface 21b.

Referring back to FIG. 2, the holder insertion port 22a has a pair of probe electrode insertion portions 22d spreading outwardly from the outer surface and a pair of temperature control electrode insertion portions 22e. In FIGS. 3 and 4, the holder insertion port 22a has a rear side surface 22f which supports the sample holder H (described later) when the holder H is inserted in the aforementioned hole 22 and rotated axially along an axis extending in the direction of the insertion, i.e., the vertical direction.

In FIGS. 3, 4, and 6, a heat conductor 26 located on the side of the sample and a heat conductor support member 27 made of a heat insulating member are disposed inside the key-shaped hole 22c. As can be seen from FIG. 6, the heat conductor 26 comprises an annular plate (holder contact portion) 26a, a straight rod portion 26b, and a connector portion 26c.

As shown in FIGS. 3 and 4, the heat conductor support member 27 has an annular plate portion 27a and a cylindrical portion 27b coupled to the outer fringe of the annular plate portion 27a. The cylindrical portion 27b is provided with a notch 27c (FIG. 4) to permit the straight rod portion 26b of the heat conductor 26 to extend outwardly through the cylindrical portion 27b.

The heat conductor 26 on the side of the sample and the heat conductor support member 27 mounted inside the key-shaped hole 22c in the stage base plate 21 are firmly mounted to the stage base plate 21 by both a ring plate 28 and a rectangular plate 29 shown in FIGS. 4 and 5. The plates 28 and 29 are made of a good thermal conductor. A heat insulating member 102 is inserted between the straight rod portion 26b of the heat conductor 26 and the stage base plate 21 to thermally isolate the heat conductor 26 from the stage base plate 21. Similarly, another heat insulating member 102 is interposed between the straight rod portion 26b and the rectangular plate 29 for the same purpose.

In FIGS. 2–4, four spring insertion holes 31 are formed in the front surface of the stage base plate 21 and are spaced 90° from each other. Spring support blocks 32 made of a heat insulating member and leaf springs 33 are mounted to the front surface of the stage base plate 21 and located opposite to the spring insertion holes 31, respectively.

The leaf springs 33 extend through the spring insertion holes 31, respectively. The front ends of the leaf springs 33 rearwardly push the heat conductor 26 inside the holder insertion hole 22.

Figure 7A:
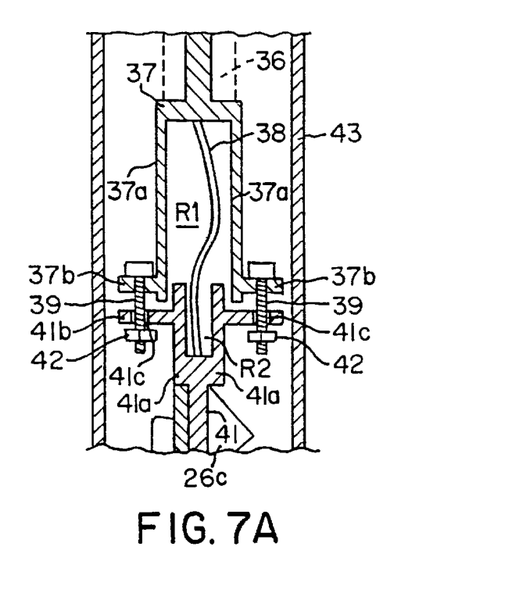
FIG. 7A is an enlarged cross section of a heat conductor shown in FIG. 1.

In FIGS. 1 and 7A, a heat conductor 36 on the side of a cryogenic source is connected to the above-described liquid helium vessel 34. A heat shield 37 on the side of the cryogenic source has a base end which is connected with the front end of the heat conductor 36 on the side of the cryogenic source. This heat shield 37 has a shielding cylinder 37a having an opening extending from the base end toward the front end. A heat shielding space R1 on the side of the cryogenic source is formed inside the shielding cylinder 37a. A flexible heat conductor 38 consisting of a laminate metal foil is disposed in the heat shielding space R1. The flexible heat conductor 38 has a base end that is connected to the base end of the heat shield 37 on the side of the cryogenic source.

The base end of the flexible heat conductor 38 may be connected with the heat shield 37 on the side of the cryogenic source by well-known fastening means. For example, the base end of the flexible heat conductor 38 can be mounted to the heat shield 37 with screws (not shown).

The heat shielding space R1 on the side of the cryogenic source is open at its front side to permit insertion of the flexible heat conductor 38. The shielding cylinder 37a forming the shielding space R1 has bolt support portions 37b at its front end, the bolt support portions 37b spreading outward. Bolts 39 extending toward the front ends of the bolt support portions 37b, respectively, are screwed into these bolt support portions 37b, respectively.

One end of a heat shield 41 (FIGS. 1 and 2 on the sample side is connected with the connector portion 26c of the heat conductor 26 (FIG. 2) on the sample side.

In FIGS. 1 and 7A, the heat shield 41 on the side of the sample has a shielding cylinder 41a having an opening extending from its one end toward its opposite end, the shielding cylinder 41a being connected to the connector portion 26c. The space inside the shielding cylinder 41a forms a heat shielding space R2 on the side of the sample. The aforementioned flexible heat conductor 38 can be inserted into the other side of the heat shielding space R2 on the sample side.

The entrances to the heat shielding spaces R1 and R2 are located opposite to each other. The front ends of the flexible heat conductor 38 disposed in these spaces are connected to one end of the heat shield 41 on the sample side through the entrances. The flexible heat conductor 38 permits heat transfer from the heat conductor 37 on the side of the cryogenic source to the heat shield 41 on the sample side. When the cryogenic source is fixed, the flexible heat conductor 38 allows movement of the sample stage. Furthermore, the flexible heat conductor 38 minimizes transfer of vibrations from the cryogenic source to the sample stage.

Through hole-forming portions 41b are formed at the front end of the shielding cylinder 41a that forms the heat shielding space R2 on the sample side. The through hole-forming portions 41b spread outward and are provided with holes 41c extending therethrough. The aforementioned bolts 39 can be inserted into these holes 41c, respectively. The front ends of the bolts 39 supported to the above-described bolt support portions 37b of the heat shield 37 on the side of the cryogenic source extend through the holes 41c, respectively, without touching the walls defining the holes 41c. Nuts 42 are screwed over the front ends of the bolts 39, respectively, to prevent the bolts from coming off.

Therefore, when the heat shield 37 on the side of the cryogenic source and the heat shield 41 on the sample side are moved away from each other, if the nuts 42 screwed over the bolts 39 bear against the walls defining the holes 41c, the two shields 37 and 41 no longer move away from each other. Consequently, the bolt support portions 37b, bolts 39, through hole-forming portions 41b, holes 41c, and nuts 42 together constitute a relative movement-limiting means for limiting the distance between the shields 41 and 37 below a given value.

Figure 7B:
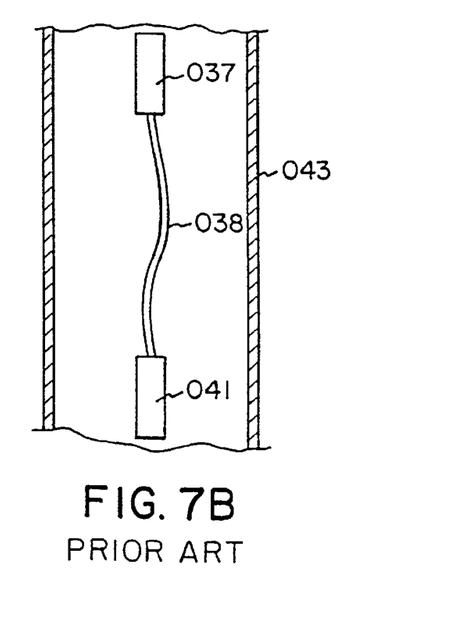
FIG. 7B is a view similar to FIG. 7A, but showing the prior art heat conductor.

FIG. 7B shows the structure of the prior art heat conductor, for comparison with the novel heat conductor shown in FIG. 7A. In this prior art structure, a heat conductor 038 of a metal foil is used to prevent transfer of vibrations from a cryogenic source to a heat shield 041 on the sample side via a heat shield 037 on the side of the cryogenic source. Since any member for limiting the distance between these two shields 037 and 041 is not used, there is a danger that the flexible heat conductor 38 will be pulled and torn.

On the other hand, in the embodiment shown in FIG. 7A, the relative movement-limiting means prevents a tensile force from being applied to both ends of the flexible heat conductor 38. In consequence, the flexible heat conductor is prevented from being torn.

In FIGS. 1 and 7A, components 37–42 etc. are surrounded by an outer heat shield 43 connected to the liquid nitrogen vessel. The flexible heat conductor 38 is thermally shielded by the heat shield 37 on the side of the cryogenic source and the heat shield 41 on the sample side and also by the outer heat shield 43. That is, the flexible heat conductor 38 is doubly thermally shielded. Therefore, flow of heat into the flexible heat conductor 38 due to external radiation is reduced.

Referring back to FIG. 1, another heat shield 37' similar to the heat shield 37 on the side of the cryogenic source is connected with the liquid nitrogen vessel 35 and located on the side of the cryogenic source. A heat shield 41' on the sample side is similar to the heat shield 41 on the sample side and is connected to the stage base plate 21.

The shielding cylinder of the heat shield 37' on the side of the cryogenic source forms a heat shielding space R1' on the side of the cryogenic source. The shielding cylinder of the heat shield 41' on the side of the sample forms a heat shielding space R2' on the sample side.

A flexible heat conductor 38' similar to the aforementioned flexible heat conductor 38 is disposed in the heat shielding space R1 on the side of the cryogenic source and in the heat shielding space R2 on the sample side. The flexible heat conductor 38' is connected to the heat shield 37' on the side of the cryogenic source and to the heat shield 41' on the sample side.

The distance between these two heat shields 37' and 41' is prevented from becoming greater than a given value by bolts 39' and nuts 42', in the same way as the heat shields 37 and 41.

The sample holder H to be inserted in the hole 22 formed in the stage base plate 21 is next described by referring to FIGS. 8A, 8B, 8C, 9, 10, 11A, 11B and 11C. When this sample holder H is inserted into the hole 22 created in the stage base plate 21 shown in FIGS. 1–4, the holder is moved from the front side of the stage base plate 21 toward the rear side along the X-axis. That is, the holder H is inserted in the rearward direction, i.e., in the -X-direction.

In FIGS. 8A, 8B, 8C, and 9, the sample holder H has a metallic body 52 affixed to the rear end of a holder support rod 51 which faces the holder to be inserted. As can be seen from FIGS. 8A, 8C, and 10, the body 52 of the holder comprises a cylindrical member having a bottom. A pair of cutouts 52a for receiving probe electrodes and a pair of cutouts 52b for receiving temperature-controlling electrodes are formed in the outer surface of the cylindrical member. A disk-like, thermally and electrically insulating member 53 is attached to the inner surface of the body 52 of the holder with screws 54 (see FIG. 8C).

The aforementioned probe electrodes, 56, are aligned to the above-described cutouts 52a, respectively, and mounted to the rear surface of the insulating member 53 which faces the inserted holder by screws 57 (FIG. 8) and the screws 54 described above. The aforementioned temperature-controlling electrodes, 58 are aligned to the cutouts 52b described previously, and are fixedly mounted by screws 59 (FIG. 8) to the rear surface of the insulating member 53 which faces the holder to be inserted. The thickness of the temperature-controlling electrodes 58, taken along the X-axis, is made somewhat smaller than that of the probe electrodes 56.

A sample T is held between the front ends of the probe electrodes 56. A probe current used for a measurement is supplied from a power supply (not shown) via the probe electrodes 56.

In this embodiment, the temperature of the sample T is not measured and so none of the temperature-controlling electrodes 58 are employed. However, if the temperature of the sample T is measured, or if the temperature is controlled with a heater, requisite members can be installed on the temperature-controlling electrodes 58 in use. It is to be noted that various known structures can be used for the holder body 52, probe electrodes 56, temperature-controlling electrodes 58, etc.

In FIGS. 8B, 8C, 9, 11A, 11B and 11C a pair of pushing force-generating members 61 have pushing force-generating-and-engaging surfaces 62, respectively, which spread outwardly. Each pushing force-generating-and-engaging surface 62 has inclined surfaces 62a at its both ends. The pushing force-generating members 61 are aligned to the cutouts 52b for receiving temperature-controlling electrodes and mounted with screws 63 to the front surface of the body 52 of the holder that faces away from the inserted holder.

The pushing force-generating-and-engaging surfaces 62 of the pushing force-generating members 61 are located ahead of, and adjacent to, the temperature-controlling electrodes 58. When viewed along the X-axis, the engaging surfaces 62 overlap the temperature-controlling electrodes 58. The pushing force-generating-and-engaging surfaces 62 extend along the outer surface of the body 52 of the holder formed by cutting the above-described cylindrical member having a bottom. The inclined surfaces 62a are formed at both ends of each engaging surface 62.

Figure 12:
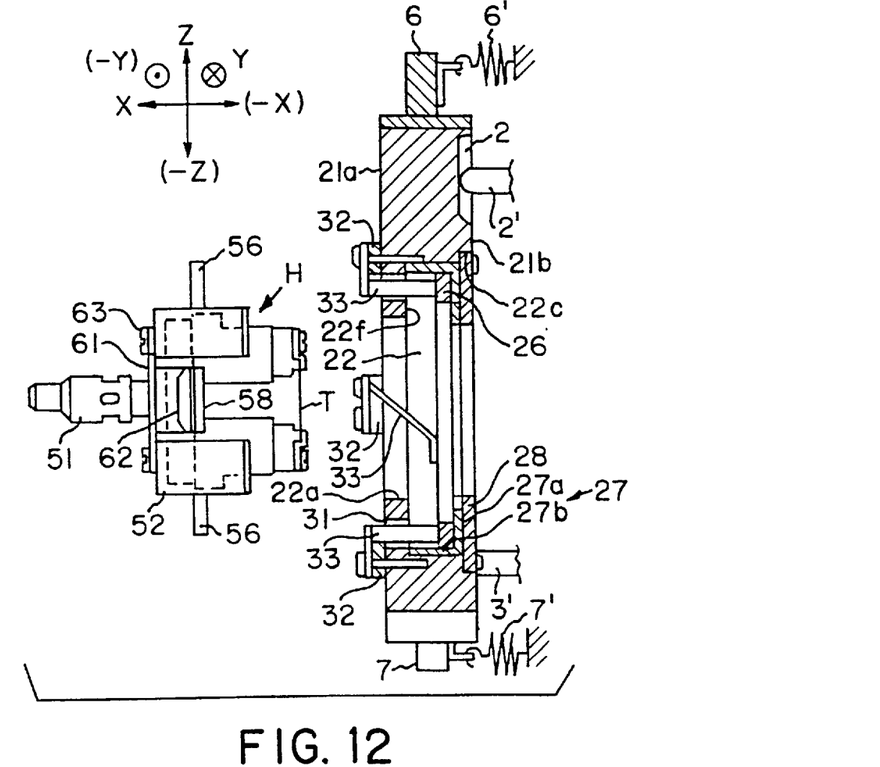
FIG. 12 is a side elevation of the sample stage shown in FIG. 1, and in which the sample holder shown in FIGS. 8A–8C is yet to be mounted on the sample stage.
Figure 13A:
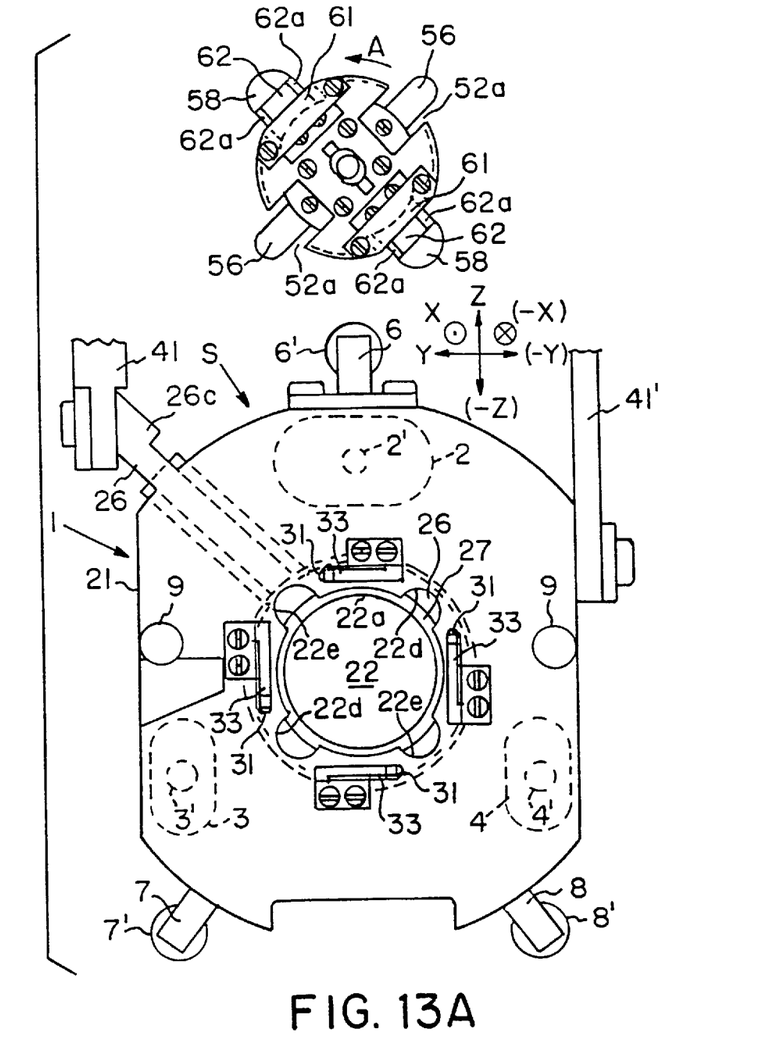
FIGS. 13A and 13B are front elevations of the sample stage shown in FIG. 1, illustrating the manner in which the sample holder shown in FIGS. 8A–8C is mounted on the sample stage.
Figure 13B:
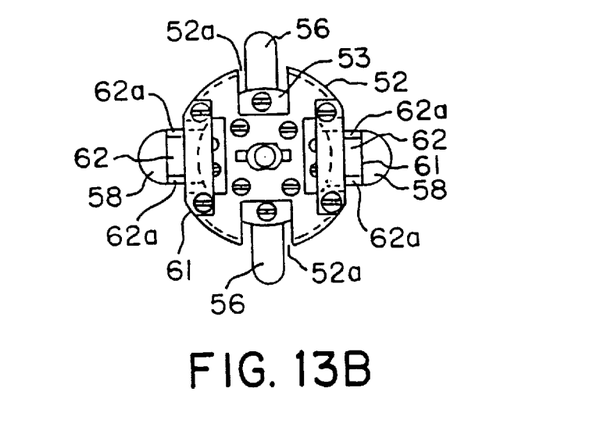
Figure 14:
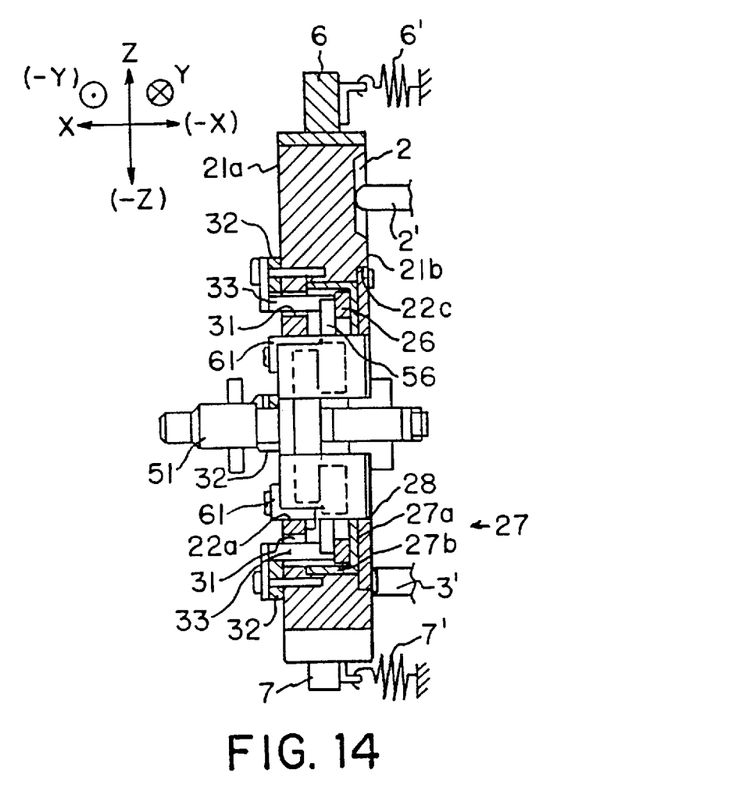
FIG. 14 is a side elevation of the sample stage shown in FIG. 1, and in which the sample holder shown in FIGS. 8A–8C has been mounted on the sample stage.

The manner in which the sample holder is mounted on the sample stage is next described by referring to FIGS. 12–14. FIG. 12 is a side elevation of the sample stag shown in FIG. 1, and in which the sample holder H shown in FIG. 8 is yet to be mounted on the sample stage. FIG. 13 is a front elevation of the sample holder, illustrating the method of mounting the stage on the holder. FIG. 14 is a side elevation of the sample stage shown in FIG. 8, and in which the sample holder has been mounted on the sample stage.

FIG. 12 shows the condition in which the sample in the sample holder H is placed opposite to the front surface of the holder insertion hole 22 formed in the body 1 of the sample stage S of the scanning probe microscope. FIG. 13A is a view of the sample holder H, taken from the side of the holder support rod 51.

In FIG. 13A, the probe electrodes 56 of the sample holder H and the temperature-controlling electrodes 58 are positioned opposite to the probe electrode insertion portions 22d and temperature control electrode insertion portions 22e, respectively, of the holder insertion port 22a. Under this condition, if the sample holder H is moved forward, i.e., in the -X-direction, or in the direction to insert the sample holder, the holder H is inserted into the hole 22 through the holder insertion port 22a.

Then, if the sample holder H is rotated through 45° in the direction indicated by the arrow A in FIG. 13A, then the holder H assumes a state shown in FIG. 13B. When the sample holder H is rotated through 45° from the stage shown in FIG. 13A to the stage shown in FIG. 13B, the inclined surfaces 62a of the pushing force-generating-and-engaging surfaces 62 come into engagement with the holder supporting rear side surface 22f (FIG. 12) and is pushed in the direction to insert the holder, i.e., in the -X-direction. Thus, the sample holder H is pushed in the direction to insert the holder. When the sample holder H is rotated through 45° and assumes the state of FIG. 13B, the central portion of each pushing force-generating-and-engaging surface 62 which is located between the inclined surfaces 62a at both ends comes into engagement with the holder-supporting rear side surface 22f and is pushed in the direction to insert the holder. As a result, the holder H is pushed in the direction to insert the holder, i.e., in the -X-direction.

At this time, the probe electrodes 56 and temperature-controlling electrodes 58 are advanced between the front end of each leaf spring 33 and the heat conductor 26 on the sample side. These electrodes 56 and 58 are urged in the direction to insert the holder by the lead springs 33. Electrical power is fed to the probe electrodes 56 and temperature-controlling electrodes 58 via the leaf springs 33 from a feeder cable (not shown) connected with the springs 33. A heater (not shown) is connected between the temperature-controlling electrodes 58. The sample temperature can be set at will within a given range by appropriately adjusting the amount of heat generated by the heater.

The sample holder H is pushed in the direction to insert the holder by the pushing force of the leaf springs. This pushing force is surpassed by the pushing force exerted by the pushing force-generating-and-engaging surfaces 62 and holder-supporting rear side surface 22f. Therefore, the sample holder H is pushed in the direction to insert the holder with a larger pushing force than in the prior art technique where the pushing force is derived only from the lead springs 33. It follows that the probe electrodes 56 are pushed against the heat conductor 26 by a larger pushing force than heretofore. This increases the area of the surface of the heat conductor 26 in contact with the probe electrodes 56, thus enhancing the efficiency of transfer of heat from the electrodes 56 to the heat conductor 26. The temperature-controlling electrodes 58 is made thinner than the probe electrodes 56 as mentioned previously. Therefore, the temperature-controlling electrodes 58 do not touch the heat conductor 26 on the sample side.

Heat shielding is next described. It is assumed that a member has been cooled down to the temperature of liquid helium. Transfer of heat to this member from surroundings is carried out, of course, by conduction, radiation, and convection. Among them, the convection can be neglected in vacuum. Conduction of heat from a member in direct contact can be reduced by appropriately selecting and using a heat conducting material, i.e., having a small thermal conductivity.

The most important for scanning probe microscopy and similar applications is radiative heat transfer. For example, where surfaces A and B having different temperatures face each other, the radiative heat transfer is independent of the distance between them but in proportion to the fourth power of the temperature difference.

As an example, it is assumed that the surface A is at the liquid helium temperature (for simplicity, let this temperature be equal to 5 K) and that the surface B is at room temperature (22° C.=295 K). Suppose a surface C at the liquid nitrogen temperature (approximately 80 K) is interposed between them. Because of the heat shielding of the surface C, the amount of heat conducted from the surface A to the surface B by radiation is given by $$(80-5)^4/(295-5)^4 = 1/224$$

As can be seen from this simple example of calculation, where cooling down to a cryogenic temperature is done, effective heat shielding is indispensable to the cooling.

In the instrument of the illustrated embodiment, low temperature provided by the liquid nitrogen is conducted from the liquid nitrogen vessel 35 to the stage base plate 21 via the heat shield 37' on the side of the cryogenic source, the flexible heat conductor 38', and the heat shield 41' on the sample side. The result is that the whole stage base plate 21 including the ring plate 28 and the rectangular plate 29 is cooled down to the liquid nitrogen temperature.

The low temperature of the liquid nitrogen is further transferred to the body 52 of the holder via the pushing force-generating members 61 in contact with the stage base plate 21, so that the body 52 of the holder is cooled down to the liquid nitrogen temperature. As a result, the sample T surrounded by the holder body 52 is thermally shielded from the surroundings and thus kept at the liquid nitrogen temperature.

On the other hand, the low temperature provided by the liquid helium is transferred from the liquid helium vessel 34 to the heat conductor 36 on the sample side via the heat conductor 36 on the side of the cryogenic source, the heat shield 37 on the side of the cryogenic source, the flexible heat conductor 38, and the heat shield 41 on the sample side. Consequently, the heat conductor 26 on the sample side is cooled down to the liquid helium temperature. At this time, the path of transfer of the low temperature due to the liquid helium is entirely surrounded by the outer heat shield 43, stage base plate 21, ring plate 28, and rectangular plate 29 which have been cooled to the liquid nitrogen temperature. In consequence, flow of heat into the heat conductor 26 on the sample side from the surroundings is reduced to a minimum. As a result, the heat conductor 26 on the sample side can reach the liquid helium temperature in a short time. Furthermore, the amount of liquid helium consumed per unit time is minimized.

The low temperature provided by the liquid helium is conducted to the heat conductor 26 on the sample side without loss in this way. The low temperature is then transferred to the sample T via the probe electrode 56 in contact with the heat conductor 26 on the sample side. As a result, the sample T is cooled by the low temperature of the liquid helium. Since the sample T is thermally shielded by the body 52 of the holder as described above, the amount of flow of heat into the sample T from the surroundings is very small. Moreover, the sample T is quickly cooled close to the liquid helium temperature.

While the preferred embodiment of the invention has been described, it is to be understood that the present invention is not limited to the foregoing embodiment. For example, in the above embodiment, the pushing force-generating members 61 having the pushing force-generating-and-engaging surfaces 62 are located opposite to the cutouts 52b in the body 52 of the holder, the cutouts 52b being used for insertion of the temperature-controlling electrodes. The pushing force-generating members 61 may also be located opposite to the cutouts 52a that receive the probe electrodes. In this case, the outwardly extending portions including the pushing force-generating-and-engaging surfaces 62 are inserted into the holder insertion hole 22 through the probe electrode insertion portions 22d. Furthermore, the pushing force-generating members 61 can be mounted on other desired portions of the body 52 of the holder. In this case, the wall defining the holder insertion port 22a is required to have other cutouts extending outwardly to permit the outwardly extending portions including the pushing force-generating-and-engaging surfaces 62 to be inserted from the holder insertion port 22a.

In addition, in the illustrated embodiment, the inclined surfaces 22a formed on the pushing force-generating-and-engaging surfaces 62 are helpful in smoothing the engagement with the rear side surface 22f when the sample holder H is rotated about the axis of insertion. Inclined surfaces may be formed on the rear side surface 22f while omitting the inclined surface 22a. That is, the engagement of the pushing force-generating-and-engaging surfaces 62 with the holder-supporting rear side surface 22f can be made smoothly by forming inclined surfaces either on the engaging surfaces 62 or on the rear side surface 22f. Moreover, this can be accomplished by forming spherical protrusions on one of these two kinds of surfaces 62 and 22f instead of the inclined surfaces.

Both ends of the flexible heat conductors 38 and 38' can be connected to the heat conductors 36, 36' on the side of the cryogenic side and to the heat conductors 26, 26' on the sample side directly, via intermediate heat conductors, via the heat shields 37, 37' on the side of the cryogenic source, or via the heat shields 41, 41' on the sample side.

As described thus far, a sample-cooling device according to the present invention comprises a sample stage, a first cooling means for cooling the sample stage to a first temperature, a first heat conductor mounted to the sample stage via a heat insulating member, a second cooling means for cooling the first heat conductor to a second temperature lower than the first temperature, and a sample holder removably attached to the sample stage. The sample holder has a contact portion which is brought into contact with the first heat conductor on the sample side. Therefore, the device is able to cool the sample to an extremely low temperature.

What is claimed is:

1. A sample-cooling device for use in a microscope having a scanning probe comprising:

a sample stage and a sample holder mountable in the sample stage such that the sample stage and sample holder position a sample held by the sample holder under the scanning probe;

a first cooling means for cooling said sample stage to a first temperature;

a second cooling means for cooling the sample holder to a second temperature lower than said first temperature;

a first heat conductor mounted to said first cooling means and said sample stage;

a second heat conductor mounted to said second cooling means and said sample holder in said sample stage, said second heat conductor having a connector portion for making thermal contact with said sample holder, said connector portion being mounted to said sample stage; and a heat insulating member inserted between said connector portion and said sample stage.

2. The sample-cooling device of claim 1, further comprising means for moving the sample stage.

3. The sample-cooling device of claim 1, wherein said sample stage has a central open portion for receiving said sample holder and wherein said sample holder is placed over said connector portion.

4. The sample-cooling device of claim 1, wherein said sample stage has a central portion provided with a hole having a bottom portion in which said connector portion is received, and wherein said sample holder is placed over said connector portion.

5. The sample-cooling device of claim 1, wherein said sample holder comprises a holder body having a second connector portion for making a thermal contact with said sample stage, an insulating member mounted to said holder body, a sample-holding portion mounted to said insulating member and having a third connector portion for making a thermal contact with said connector portion;

said holder body being cooled to said first temperature by a thermal contact with said sample stage; and said sample-holding portion being cooled to said second temperature by a thermal contact with said connector portion.

6. The sample-cooling device of any one of claims 1 to 5, wherein said first cooling means has a first refrigerant vessel holding a first refrigerant and wherein said second cooling means has a second refrigerant vessel holding a second refrigerant.

7. The sample-cooling device of claim 6, wherein said first refrigerant is liquid nitrogen and said second refrigerant is liquid helium.

8. The sample-cooling device of claim 1, wherein each of said first and second heat conductors has a flexible heat conductor.

9. The sample-cooling device of claim 8, wherein a distance-limiting means is connected between both ends of each flexible heat conductor to limit the distance between both ends of said flexible heat conductor.

* * * * *